(12) United States Patent
Lee

(10) Patent No.: US 6,208,046 B1
(45) Date of Patent: Mar. 27, 2001

(54) STEPPING MOTOR

(75) Inventor: In Ho Lee, Suwon-Shi (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/452,744

(22) Filed: Dec. 1, 1999

(30) Foreign Application Priority Data

Mar. 17, 1999 (KR) .................................................. 99-8996

(51) Int. Cl.$^7$ ............................. H02K 5/17; H02K 37/00
(52) U.S. Cl. ......................... 310/49 R; 310/67 R; 310/90
(58) Field of Search ............................... 310/49 R, 67 R, 310/90, 91; 384/610, 420, 425, 223, 243; 360/99.07, 99.08, 99.05

(56) References Cited

U.S. PATENT DOCUMENTS

| | | | |
|---|---|---|---|
| 5,486,054 | * 1/1996 | Nagata et al. | 384/610 |
| 5,777,413 | * 7/1998 | Nagata et al. | 310/90 |
| 5,886,438 | * 3/1999 | Kawanishi | 310/90 |
| 5,907,199 | * 5/1999 | Miller | 310/12 |

* cited by examiner

*Primary Examiner*—Tran Nguyen
(74) *Attorney, Agent, or Firm*—Darby & Darby

(57) ABSTRACT

A stepping motor for optical pick-up devices is disclosed. In the stepping motor, a stator, having a coil and a yoke, is fixed to a first support plate. A rotating shaft is rotated by the coil of the stator, with a first end of the shaft being inserted into the stator and a second end being exposed outside the stator and being externally threaded to form a lead screw. The first and second ends are each domed. A first holder, having a trapezoidal dent, rotatably holds the domed first end of the shaft within the trapezoidal dent while being brought into point contact with the domed first end. A second holder, having a trapezoidal dent, rotatably holds the domed second end of the shaft within the trapezoidal dent while being brought into point contact with the domed second end. The second holder is supported by a second support plate while being normally and elastically biased by a spring means in an axial direction of the rotating shaft, thus elastically supporting the shaft in the axial direction. Due to such a simple support structure for the rotating shaft, the stepping motor has a reduced number of elements and is easily produced through a simple process while accomplishing improved operational reliability and improved productivity and reducing the operational noises.

6 Claims, 4 Drawing Sheets

STEPPING MOTOR

BACKGROUND OF THE INVENTION

1. Field of the Invention

The present invention relates, in general, to stepping motors for optical pick-up devices and, more particularly, to a structural improvement in such stepping motors to simplify the support structure for a motor's rotating shaft engaging with a pick-up unit at a lead screw and feeding the pick-up unit by the screw in an axial direction, the structural improvement thus reducing the number of required elements, simplifying the assembling process and improving the operational reliability and productivity of stepping motors.

2. Description of the Prior Art

As well known to those skilled in the art, a stepping motor, also known as a step-servo motor, is provided within an optical pick-up device for feeding a pick-up unit. In such a stepping motor, a rotating shaft has a lead screw and engages with the pick-up unit at the lead screw, thus allowing the pick-up unit to reciprocate in an axial direction along the lead screw in accordance with a rotating action of the rotating shaft.

An example of conventional stepping motors for optical pick-up devices may be referred to Japanese Patent Laid-open Publication No. Heisei. 9-154,217. The above Japanese stepping motor is described hereinbelow with reference to FIGS. 1 and 2.

As shown in FIG. 1, the conventional stepping motor comprises a stator 100 and a rotating shaft 200. The stator 100 consists of a casing 110, two doughnut coils 120 and a yoke 130.

In the stator 100, the casing 110 has a hollow cylindrical shape, with the top and bottom walls radially and inwardly extending from the top and bottom circular ends of the casing's outer wall so as to form an annular shape. The top and bottom walls of the casing 100 also respectively extend from their inside ends toward each other in a vertical direction. That is, the top wall extends downwardly from its inside end to form an upper inner wall, while the bottom wall extends upwardly from its inside end to form a lower inner wall, with a gap being left between the ends of the two inner walls.

The yoke 130, providing a passage for magnetic flux within the stator 100, is horizontally positioned within the gap between the ends of the two inner walls of the casing 110 and is integrated with the interior surface of the outer wall of the casing 110. The yoke 130 thus forms two annular chambers within the casing 110, with the two doughnut coils 120 being respectively received within the two chambers.

The above stator 100 is fixedly supported on a first support plate 600 of an optical pick-up device at its bottom wall.

A rotating shaft 200 passes through the center of the first support plate 600 upwardly prior to being partially inserted into the center of the stator 100 in a direction from the bottom of the casing 110. The above shaft 200 is externally threaded at a portion exposed to the outside of the support plate 600, thus forming a lead screw 210 which movably engages with a pick-up unit.

A cylindrical magnet 220 is fixedly fitted over the top portion of the rotating shaft 200 within the casing 110 of the stator 100, and so the magnet 220 and the doughnut coils 120 are concentrically positioned within the casing 110. When the coils 120 are turned on, an electromagnetic force is formed between the magnet 220 and the coils 120 within the casing 110.

Both ends of the shaft 200 are each provided with a V-shaped groove 230, with a steel ball 240 being rotatably seated on each groove 230.

A guide plate 300 is positioned on the top wall of the stator 100. Vertically formed at the central portion of the above plate 300 is a guide hole having a predetermined diameter.

A first holder 410, or a movable holder having a depressed ball seat on its lower surface, is received within the guide hole of the guide plate 300 in a way such that the holder 410 is vertical movable within the guide hole of the plate 300 with the depressed seat being directed downwardly. A first steel ball 240 is rotatably seated between the depressed ball seat of the first holder 410 and the top groove 230 of the rotating shaft 200.

The above guide plate 300, positioned on the top wall of the stator 100, is covered with a cap 500 that is fitted over the top end portion of the stator 100. The top wall of the cap 500 is partially cut along a U-shaped cut line at one or more angularly spaced positions as shown in FIG. 2, thus forming one or more cut pieces. The cut pieces of the cap 500 are, thereafter, bent downwardly at an angle of inclination, thus forming one or more plate springs 510.

When the cap 500 is fitted over the top end portion of the stator 100, each plate spring 510 is brought into contact with the top surface of the first holder 410 at its free end, thus normally biasing the first holder 410 downwardly.

The skirt of the cap 500 comes into elastic engagement with the external surface of the casing 110 at its lower edge, and so the cap 500 is easily removable from the stator 100 when necessary.

A second steel ball 240, rotatably seated on the bottom groove 230 of the rotating shaft 200, is also rotatably seated in the depressed ball seat of a second holder 420. That is, the second steel ball 240 is rotatably seated between the bottom groove 230 of the shaft 200 and the ball seat of the second holder 420. The above second holder 420 is fixedly mounted to a second support plate 700, thus being so-called "a fixed holder".

It is thus noted that the rotating shaft 200 is elastically supported by the first holder 410 rather than the second holder 420.

When the coils 120 of the stator 100 are activated by electric power from an external power source, an electromagnetic force is formed between the magnet 220 and the coils 120, thus rotating the shaft 200. When the rotating shaft 200 is rotated as described above, the pick-up unit, engaging with the lead screw 210 of the shaft 200, axially moves along the lead screw 210.

In the above-mentioned stepping motor, the rotating shaft 200 is designed to be rotated in opposite directions so as to allow the pick-up unit to axially reciprocate along the lead screw 210 as desired. The shaft 200 thus may undesirably move in the axial direction due to an inertia force, that is generated from the pick-up unit at a time the moving direction of the pick-up unit is changed. If such an undesirable axial movement of the rotating shaft 200 is not effectively absorbed by a shock absorption means, the shaft 200 may be impacted, damaged and deformed.

In an effort to absorb impact caused by such an undesirable axial movement of the rotating shaft 200 due to the inertia force, the conventional stepping motor is provided with the guide plate 300, the first holder 410 and the plate springs 510.

In a detailed description, the second steel ball 240 is rotatably seated between the bottom groove 230 of the rotating shaft 200 and the ball seat of the fixed second holder 420, thus only rotatably supporting the bottom end of the shaft 200. Meanwhile, the first steel ball 240 is rotatably seated between the top groove 230 of the rotating shaft 200 and the depressed ball seat of the first holder 410 which is normally biased downwardly by the plate springs 510 of the cap 500, thus absorbing the impact caused by the undesirable axial movement of the shaft 200.

Since the undesirable axial movement of the rotating shaft 200, caused by the inertia force generated from the pick-up unit at a time the moving direction of the pick-up unit is changed, is absorbed by the plate springs 510 of the cap 500 elastically biasing the first holder 410 downwardly, the rotating shaft 200 is somewhat stably operated even when the axial moving direction of the pick-up unit is changed.

However, the above-mentioned stepping motor is problematic in that it has a complex construction.

That is, a V-shaped groove 230 is necessarily formed on each end of the rotating shaft so as to rotatably support the reversibly rotatable shaft 200 while absorbing an undesirable axial movement of the shaft 200 due to an inertia force. In addition, one steel ball 240 has to be rotatably seated on each groove 230, while two holders 410 and 420 rotatably support the two steel balls 240 at both ends of the shaft 200.

Furthermore, it is necessary to elastically support the first holder 410 by the plate springs 510 of the cap 500 while allowing the holder 410 to be vertically movable along with the top end of the shaft 200 so as to absorb an undesirable axial movement of the shaft 200 when the moving direction of the pick-up unit is changed.

Such a plurality of elements for supporting the rotating shaft 200 increase the production cost, complicate the production process, and reduce productivity while producing the stepping motors. The elements are also assembled together while being brought into frictional engagement with each other. The elements thus generate operational noises while being frictionally abraded, and so the stepping motor is inconvenient to users and is reduced in durability and operational reliability.

Another disadvantage of the conventional stepping motor resides in that it is necessary to precisely machine the V-shaped grooves 230 on both ends of the rotating shaft 200. The V-shaped grooves 230 thus make the process of producing the stepping motors very difficult.

SUMMARY OF THE INVENTION

Accordingly, the present invention has been made keeping in mind the above problems occurring in the prior art, and an object of the present invention is to provide a stepping motor for optical pick-up devices, of which the rotating shaft is domed at each end thereof, thus being more easily machined in comparison with a conventional shaft having V-shaped grooves, and which has a simple support structure for the rotating shaft, thus having a reduced number of elements and being easily produced through a simple process while accomplishing improved operational reliability and improved productivity.

Another object of the present invention is to provide a stepping motor for optical pick-up devices, which is designed to have a reduced number of frictional contact surfaces, thus desirably reducing the operational noises.

In order to accomplish the above object, the present invention provides a stepping motor, comprising: a stator having both a coil and a yoke and being fixedly mounted to a first support plate; a rotating shaft selectively rotated by the coil of the stator, with a first end portion of the shaft being inserted into the stator and a second end portion being exposed outside the stator and being externally threaded to form a lead screw, the first and second end portions each having a domed shape at its distal end; a first holder having a dent rotatably holding the domed end of the first end portion while being brought into point contact with the domed end of the first end portion; and a second holder having a dent rotatably holding the domed end of the second end portion while being brought into point contact with the domed end of the second end portion, the second holder being supported by a second support plate while being normally and elastically biased by spring means in an axial direction of the shaft, thus elastically supporting the rotating shaft in the axial direction.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 3:
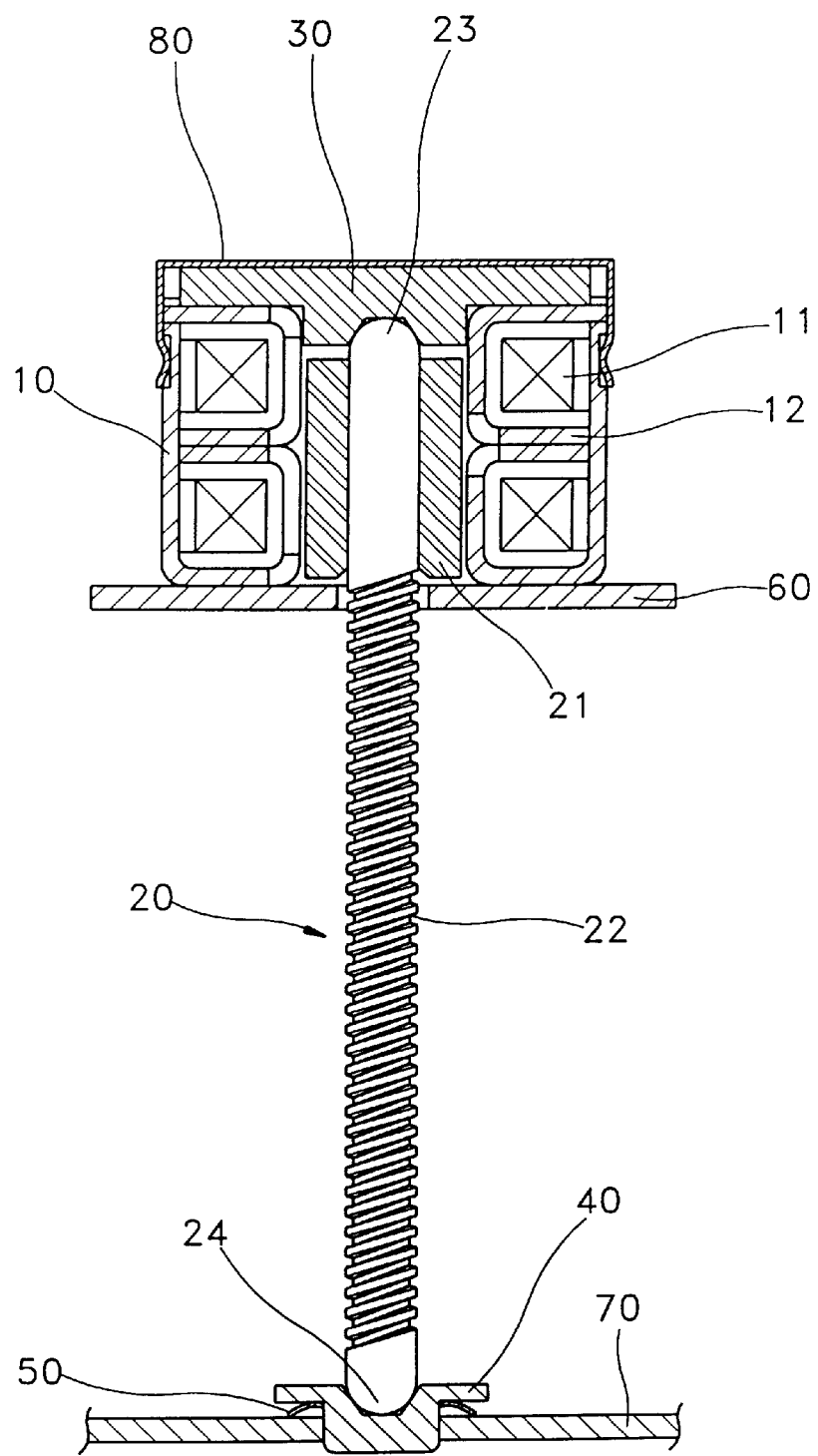
FIG. 3 is a sectional view, showing the construction of a stepping motor for optical pick-up devices in accordance with the primary embodiment of the present invention.

FIG. 3 is a sectional view, showing the construction of a stepping motor for optical pick-up devices in accordance with the primary embodiment of the present invention. In the stepping motor of this invention, the stator 10 is a power generating means which generates a drive force when it is activated by electric power from an external power source.

In the stepping motor of this invention, the stator 10 consists of two doughnut coils, or upper and lower coils 11 and a yoke 12 which are received within a casing. The yoke 12 is interposed between the two coils 11 and separates them from each other.

That is, in the same as that described for a conventional stepping motor, the casing of the stator 10 has a hollow cylindrical shape, with the top and bottom walls radially and inwardly extending from the top and bottom circular ends of the casing's outer wall so as to form an annular shape. The top and bottom walls of the casing also respectively extend from their inside ends toward each other in a vertical direction. That is, the top wall extends downwardly from its inside end to form an upper inner wall, while the bottom wall extends upwardly from its inside end to form a lower inner wall, with a gap being left between the ends of the two inner walls. The yoke 12 is horizontally positioned within the gap between the ends of the two inner walls of the casing and is integrated with the interior surface of the outer wall of the casing, thus forming two annular chambers within the casing with the two doughnut coils 11 being respectively received within the two chambers.

The above yoke 12 provides a passage for magnetic flux generated by the coils 11. The above stator 10 is fixedly and firmly supported on a first support plate 60 at its bottom wall as best seen in FIG. 3. The first support plate 60 is an element of an optical pick-up device.

The stepping motor of this invention also has a rotating shaft 20, or a rotating means electromagnetically driven by the coils 11. The above shaft 20 passes through the center of the first support plate 60 upwardly prior to being partially inserted into the center of the stator 10 in a direction from the bottom of the casing. That is, the top end of the shaft 20 is received within the stator 10, while the bottom end is positioned outside the first support plate 60.

A cylindrical magnet 21 is fixedly fitted over the top end portion of the rotating shaft 20 within the casing of the stator 10, while the exposed part of the shaft 20 outside the first support plate 60 is externally threaded, thus forming a lead screw 22. The lead screw 22 movably engages with a pick-up unit.

Both ends, or first and second ends 23 and 24, of the rotating shaft 20 each have a dome shape.

The cylindrical magnet 21 of the rotating shaft 20 and the doughnut coils 11 are concentrically positioned within the casing of the stator 10, and so an electromagnetic force is formed between the magnet 21 and the coils 11 when the coils 11 are turned on.

Figure 1:
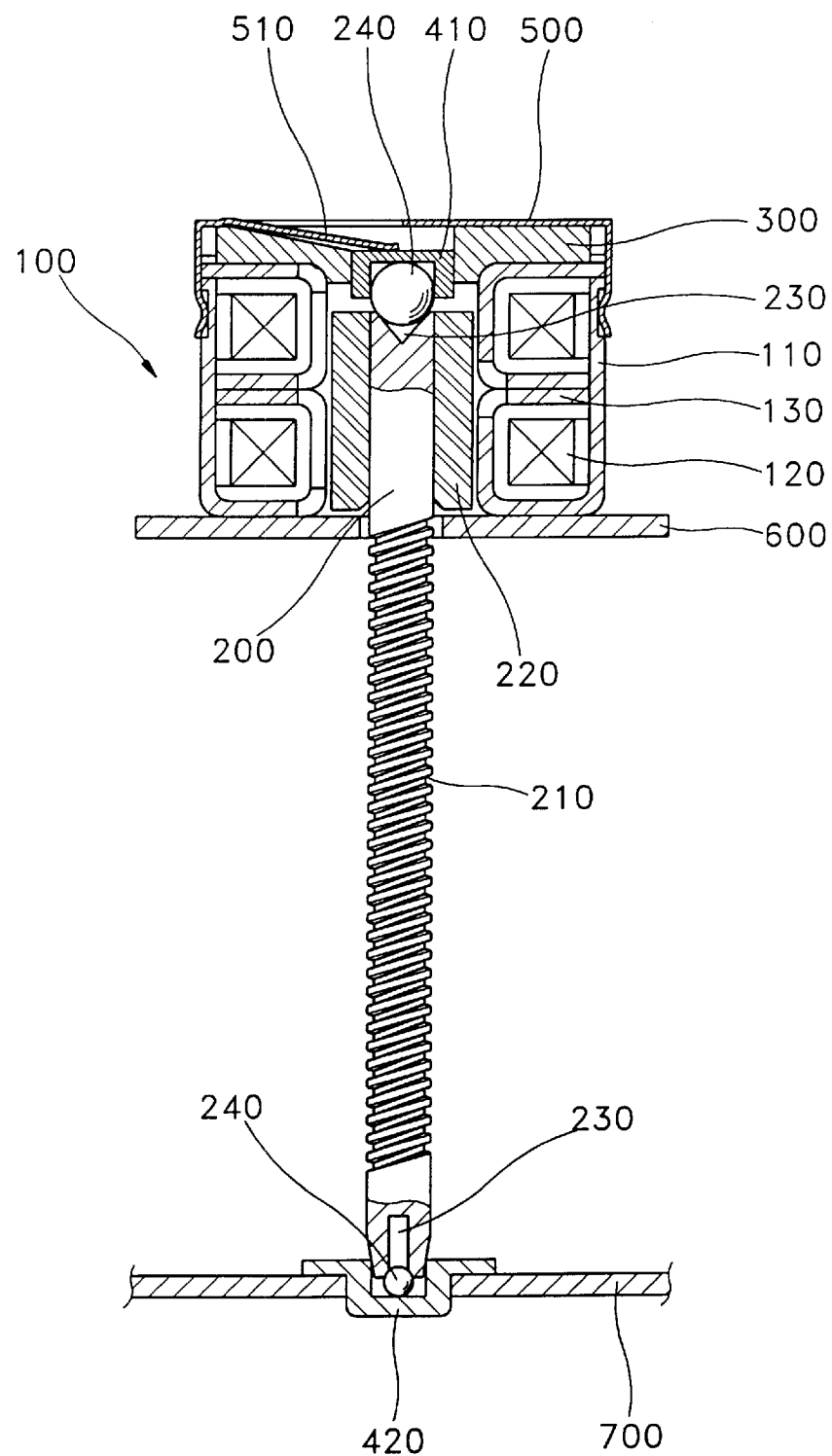
FIG. 1 is a sectional view, showing the construction of a conventional stepping motor for optical pick-up devices.
Figure 2:
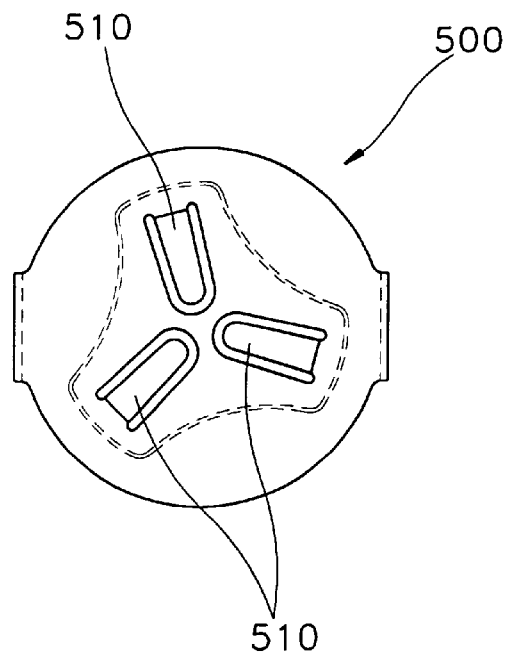
FIG. 2 is a plan view of a cap included in the stepping motor of FIG. 1.
Figure 4:
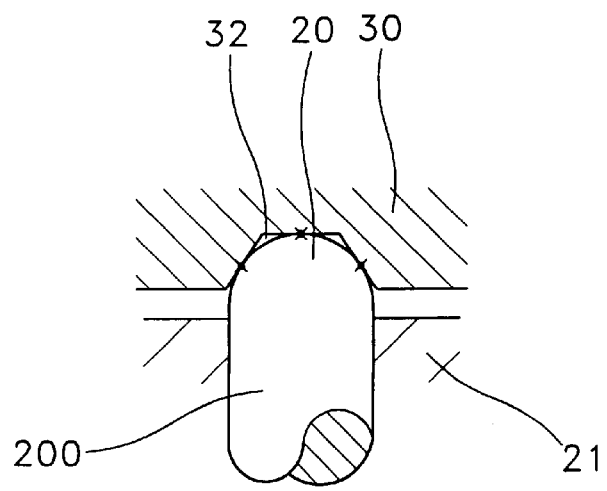
FIG. 4 is a view, showing a structure for supporting the domed top end of the rotating shaft by a first holder having a trapezoidal dent according to the primary embodiment of this invention.

In the present invention, a first holder 30 is positioned on the top wall of the stator 10 so as to cover the top wall of the stator 10. The above first holder 30 has a trapezoidal dent 32 at the center of its lower surface and rotatably holds the domed first end 23 of the shaft 20 at the dent 32 while being brought into point contact with the end 23 as shown in FIG. 4.

Since the domed first end 23 of the rotating shaft 20 is rotatably seated within the trapezoidal dent 32 of the first holder 30 while being brought into point contact with the surfaces of the dent 32, it is possible to effectively reduce the frictional force formed between the shaft 20 and the first holder 30.

Figure 5:
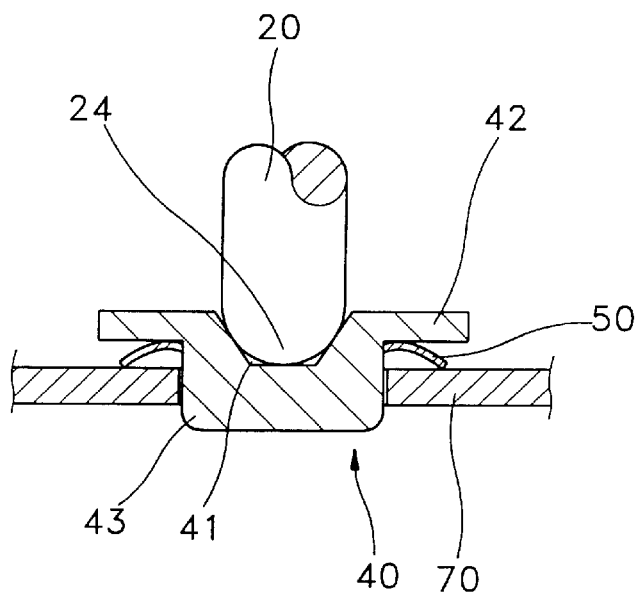
FIG. 5 is a view, showing a structure for supporting the domed bottom end of the rotating shaft by a second holder having a trapezoidal dent according to the primary embodiment of this invention.

A second holder 40 is set on a second support plate 70 at a position opposite to the first holder 30 and rotatably holds the domed second end 24 of the rotating shaft 20. In the primary embodiment, the above second holder 40 has a trapezoidal dent 41 at the center of its top surface as shown in FIG. 5.

The second holder 40 rotatably holds the domed second end 24 of the shaft 20 at the dent 41 while being brought into point contact with the end 24. In such a case, the holder 40 only allows the second end 24 of the shaft 20 to be rotatable within the dent 41.

In a brief description, the domed first and second ends 23 and 24 of the rotating shaft 20 according to the primary embodiment of this invention are rotatably supported within the trapezoidal dents 32 and 41 of the first and second holders 30 and 40 while being brought into point contact with the dents 32 and 41.

Figure 6:
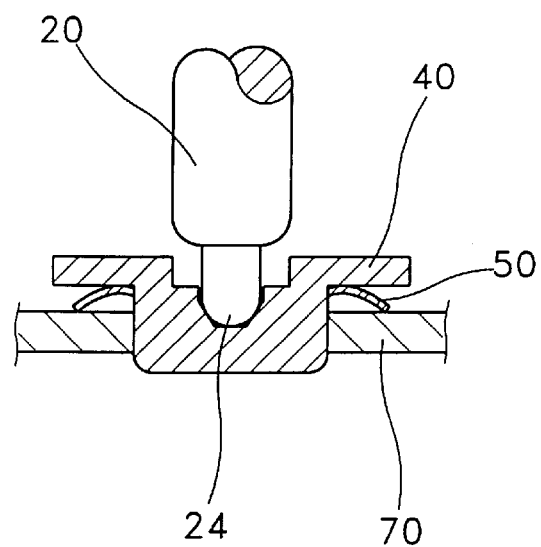
FIG. 6 is a view, showing a structure for supporting the small diameter domed bottom end of the rotating shaft by a second holder having a two stepped trapezoidal dent in accordance with another embodiment of this invention.

In accordance with the second embodiment of this invention, the second end 24 of the rotating shaft 20 may be formed with the diameter of the end 24 being smaller than that of the lead screw 22 as shown in FIG. 6. Of course, the second end 24 is domed in the same manner as that described for the primary embodiment. In order to rotatably hold the small diameter domed second end 24 of the shaft 20 while accomplishing a desired point contact between the domed end 24 and the dent 41, the dent 41 of the second holder 40 is a two stepped trapezoidal dent. The structure for supporting the domed second end 24 of the shaft 20 according to the second embodiment is particularly designed to further reduce the frictional force formed at the second end 24.

Of the two holders 30 and 40 rotatably holding the first and second ends 23 and 24 of the shaft 20, the first one 30 is fixedly positioned at the top of the stator 10, thus preventing an undesirable upward movement of the rotating shaft 20.

In the present invention, the second holder 40 has a bossed body 43 at the center, with the dent 41 being formed on the top surface of the body 43 and a flange part 42 extending outwardly around the dent 41.

The above second holder 40, having the dent 41, is set within a guide hole of the second support plate 70 while being vertically movable relative to the guide hole of the plate 70. In such a case, the second support plate 70 is a support member of the optical pick-up device. When the second holder 40 is set on the second support plate 70 as described above, the flange part 42 of the holder 40 is positioned above the top surface of the plate 70. The second holder 40 is also normally and elastically biased upwardly by a spring means 50 interposed between the flange part 42 and the second support plate 70.

In the present invention, it is preferable to use a conventional wave washer, a conventional washer spring or a conventional wave plate spring as the spring means 50.

In the stepping motor of this invention comprising the stator 10, the rotating shaft 20 and the first and second holders 30 and 40, the second holder 40 is elastically supported by the spring means 50 while being normally biased upwardly. Therefore, it is possible to effectively absorb the undesirable axial movement of the shaft 20 caused by an inertia force when the moving direction of the pick-up unit is changed. The rotating shaft 20 is thus free from being undesirably deformed.

In the above stepping motor, the second end, or the bottom end 24 of the shaft 20 extends from the stator 10 and passes through the first support plate 60 and is domed at its distal end. The domed second end 24 of the shaft 20 is rotatably held within the trapezoidal dent 41 of the second holder 40 which is elastically and movably set on the second support plate 70. In such a case, a point contact is accomplished between the domed second end 24 and the dent 41.

In addition, a cap 80 is fitted over the top portion of the stator 10. The above cap 80 thus completely covers the first holder 30 while preventing an unexpected separation of the holder 30 from the stator 10 and protecting the holder 30 from surroundings.

The skirt of the cap 80 comes into elastic engagement with the external surface of the stator 10 at its lower edge, and so the cap 80 is easily removable from the stator 10 when necessary. Due to such a cap 80, the first holder 30 is firmly supported while stably supporting the domed first end 23 of the rotating shaft 20 even when an impact, caused by an undesirable axial movement of the shaft 20, is applied to the stator 10.

When the coils 11 of the stator 10 are activated by electric power from an external power source, an electromagnetic force is formed between the magnet 21 and the coils 11, thus rotating the shaft 200. When the rotating shaft 10 is rotated as described above, the pick-up unit, engaging with the lead screw 22 of the shaft 20, axially moves along the lead screw 22.

In the stepping motor of this invention, the rotating shaft 20 is elastically supported by the spring means 50 at its second end 24 while being normally biased upwardly. It is thus possible to effectively absorb an undesirable axial movement of the shaft 20 caused by an inertia force when the moving direction of the pick-up unit is changed. The rotating shaft 20 is thus almost completely protected from being undesirably deformed.

In addition, the domed first and second ends 23 and 24 of the rotating shaft 20 are rotatably seated within the trapezoidal dents 31 and 41 of the first and second holders 30 and 40 while being brought into point contact with the surfaces of the dents 31 and 41. It is thus possible to minimize the frictional force formed between the shaft 20 and the holders 30 and 40. This finally effectively reduces the drive load of the stepping motor during an operation of the motor.

In the stepping motor of this invention, the spring means 50, used for elastically supporting the rotating shaft 20, is positioned outside the stator 10 different from a conventional stepping motor with a spring means being positioned within a stator. Such an external spring means 50 allows both the stator 10 and the rotating shaft 20 to be easily and simply assembled with the first and second holders 30 and 40. The external spring means 50 also allows a user to more easily and simply adjust the biasing force for the rotating shaft 20 when necessary.

The domed shape of the first and second ends 23 and 24 of the shaft 20 is easy to machine in comparison with the V-shaped groove formed on the ends of the shaft in a conventional stepping motor. In addition, the domed ends 23 and 24 of the shaft 20 are very easily assembled with the first and second holders 30 and 40 by simply seating the domed ends 23 and 24 within the trapezoidal dents 31 and 41 of the holders 30 and 40 while accomplishing a desired point contact between the ends 23 and 24 and the dents 31 and 41. This finally simplifies the process of assembling the elements of the stepping motor.

As described above, the present invention provides a stepping motor for optical pick-up devices. In the stepping motor of this invention, the structure of both ends of a rotating shaft in addition to the structure of two holders supporting the ends of the shaft is simply improved to minimize the drive load applied to the stepping motor during a rotating action of the shaft. Such a structural improvement also reduces the number of required elements of the stepping motor and simplifies the process of producing the stepping motor. In the stepping motor of this invention, a spring means, used for axially supporting the rotating shaft upwardly, is not installed within a stator, but is positioned outside the stator at a position between the second holder and the second support plate. Such an external spring means of this invention further simplifies the process of assembling the elements of the stepping motor and allows a user to more easily and simply adjust the biasing force for the rotating shaft when necessary. The present invention thus remarkably improves the operational reliability and productivity of stepping motors.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A stepping motor, comprising:
   a stator having both a coil and a yoke fixedly mounted to a first support plate;
   a rotatable shaft having an insert portion within said stator and an exposed portion outside the stator, the exposed portion being externally threaded to form a lead screw, said insert and exposed portions each having a dome-shaped end;
   a first holder having a dent rotatably holding the dome-shaped end of the insert portion while being brought into point contact therewith; and
   a second holder having a dent at a first end thereof rotatably holding the dome-shaped end of the exposed portion while being brought into point contact therewith, said second holder being supported at a second end thereof by a second support plate while being normally and elastically biased by spring means in an axial direction of the shaft, thus elastically supporting the rotating shaft in the axial direction, said spring means being interposed between said second support plate and a flange part of said second holder which extends outwardly from said second holder around said dent.

2. The stepping motor according to claim 1, wherein said second holder has a bossed body at a position opposite to the dent thereof, said bossed body being set in a guide hole of the second support plate so as to be movable in the axial direction of the shaft.

3. The stepping motor according to claim 1, wherein said spring means is a spring washer.

4. The stepping motor of claim 1, wherein the dome-shaped end of said exposed portion is stepped to have a diameter smaller than that of a remaining part having the lead screw.

5. The stepping motor of claim 1, wherein the dents of said first and second holders oppositely face each other and have a shape such that they taper toward the shaft and away from each other.

6. The stepping motor of claim 1, wherein the dents of said first and second holders have a trapezoidal shape.

* * * * *